United States Patent
Boira Bonhora et al.

(10) Patent No.: US 10,870,509 B2
(45) Date of Patent: Dec. 22, 2020

(54) AUTOMATIC DEVICE FOR EMPTYING BAGS OF FROZEN BLOOD PRODUCT

(71) Applicant: GRIFOLS WORLDWIDE OPERATIONS LIMITED, Dublin (IE)

(72) Inventors: Jordi Boira Bonhora, Terrassa (ES); Oriol Casanova Montpeyo, Canovelles (ES); David Pages Becerra, Espolla (ES)

(73) Assignee: GRIFOLS WORLDWIDE OPERATIONS LIMITED, Dublin (IE)

( * ) Notice: Subject to any disclaimer, the term of this patent is extended or adjusted under 35 U.S.C. 154(b) by 96 days.

(21) Appl. No.: 16/025,215

(22) Filed: Jul. 2, 2018

(65) Prior Publication Data
US 2019/0031385 A1    Jan. 31, 2019

(30) Foreign Application Priority Data
Jul. 31, 2017 (EP) .................................... 17382526

(51) Int. Cl.
*B65B 69/00* (2006.01)
*B65B 57/08* (2006.01)
(Continued)

(52) U.S. Cl.
CPC ......... *B65B 69/0008* (2013.01); *B25J 9/1633* (2013.01); *B26D 1/30* (2013.01);
(Continued)

(58) Field of Classification Search
CPC   A61J 1/10; B25J 9/1633; B25J 9/1664; B25J 9/1669; B25J 9/1679; B25J 9/1694;
(Continued)

(56) References Cited

U.S. PATENT DOCUMENTS 3,939,623 A *  2/1976  Shine ....................... A61J 1/05
                                                  53/440
4,134,508 A *  1/1979  Burdett, Jr. ......... B65B 69/0008
                                                  414/412
(Continued)

FOREIGN PATENT DOCUMENTS

DE  10 2009 056 225 A1    6/2011
EP        2236255 A1      10/2010
(Continued)

OTHER PUBLICATIONS

European Search Report of corresponding European Patent Application No. 17382526—7 pages (dated Jan. 19, 2018).
(Continued)

*Primary Examiner* — James Keenan
(74) *Attorney, Agent, or Firm* — Knobbe, Martens, Olson & Bear, LLP (57) ABSTRACT

An automatic device for emptying bags of frozen blood product includes a product removal device, a product reception hopper, a transporter for transporting the bag from a reception area to the product removal device, and at least one cutter located in the path of the bag between the reception area and the product removal device. The at least one cutter is housed in a support configured to oscillate for absorbing energy of impacts of the bag against the cutter and to return the cutter to its initial position.

12 Claims, 11 Drawing Sheets

(51) Int. Cl.
  *B26D 5/28* (2006.01)
  *B65B 59/02* (2006.01)
  *B65B 59/00* (2006.01)
  *B25J 9/16* (2006.01)
  *B26D 1/30* (2006.01)

(52) U.S. Cl.
  CPC ............... *B26D 5/28* (2013.01); *B65B 57/08* (2013.01); *B65B 59/003* (2019.05); *B65B 59/02* (2013.01); *B65B 69/0058* (2013.01)

(58) Field of Classification Search
  CPC ... B26D 1/30; B26D 3/08; B26D 5/28; B26D 7/2614; B26D 7/2628; B26D 2001/0053; B26D 2001/006; B26D 2007/2685; B65B 57/08; B65B 59/02; B65B 69/0008; B65B 69/0033; B65B 69/0058; G05B 2219/39105
  USPC ........................................................ 414/412
  See application file for complete search history.

(56) References Cited

U.S. PATENT DOCUMENTS

| | | | | |
|---|---|---|---|---|
| 4,289,438 A | * | 9/1981 | Murer | B65B 69/0008 |
| | | | | 414/412 |
| 4,616,326 A | * | 10/1986 | Meier | B23K 9/1272 |
| | | | | 318/561 |
| 4,995,770 A | * | 2/1991 | Crane | B65B 69/0008 |
| | | | | 241/236 |
| 4,995,771 A | * | 2/1991 | Sedgeley | B65B 69/0033 |
| | | | | 414/412 |
| 5,267,823 A | * | 12/1993 | Roman | B03B 9/06 |
| | | | | 209/930 |
| 5,567,106 A | * | 10/1996 | Gassner | B02C 18/0076 |
| | | | | 414/412 |
| 6,077,021 A | * | 6/2000 | Roman | B65B 69/0008 |
| | | | | 414/412 |
| 8,197,174 B1 | | 6/2012 | Caron et al. | |
| 8,690,011 B2 | * | 4/2014 | Adell | B25J 13/086 |
| | | | | 222/80 |
| 10,307,917 B2 | * | 6/2019 | Marks | B27B 19/008 |
| 2010/0242698 A1 | * | 9/2010 | Hsu | B26D 7/2614 |
| | | | | 83/332 |
| 2013/0019993 A1 | * | 1/2013 | Roura Adell | B25J 13/086 |
| | | | | 141/98 |
| 2016/0103029 A1 | | 4/2016 | Oda et al. | |

FOREIGN PATENT DOCUMENTS

| | | |
|---|---|---|
| EP | 2548705 A1 | 1/2013 |
| JP | S57-77426 A | 5/1982 |
| JP | H06-509968 A | 11/1994 |
| JP | 7-205946 A | 8/1995 |
| JP | H10-272378 A | 10/1998 |
| JP | 2001-232229 A | 8/2001 |
| JP | 2013-23287 A | 2/2013 |
| JP | 2016-078145 A | 5/2016 |

OTHER PUBLICATIONS

Office Action of corresponding Japanese Patent Application No. 2018-126617—10 pages (dated Nov. 19, 2019).

* cited by examiner

(PRIOR ART)

Fig.10

AUTOMATIC DEVICE FOR EMPTYING BAGS OF FROZEN BLOOD PRODUCT

BACKGROUND

Technical Field

The present disclosure relates to a device for emptying bags of frozen product. Preferably, said frozen product is a blood product.

To store blood products, the use of flexible plastic containers is widely known. Usually, said flexible plastic containers are bags. The most common forms in which said blood products are usually stored are raw blood, plasma, red blood cells and platelets.

In pharmaceutical laboratories specialising in blood-derived products, the bags are received full of blood product collected from donors. Said blood product arrives frozen in order to maintain said blood product in an optimal state of preservation. This frozen blood product must be removed from the bags in order to carry out the necessary handling to make use thereof in pharmaceutical applications.

Owing to the variability in the size and shape of the bags once frozen, automation of the process of removing the frozen blood product from the bags presents many technical difficulties. For this reason, the process of emptying bags of frozen blood product has conventionally been carried out manually or semi-automatically, which entails handling biohazardous products, usually in a non-ergonomic way by the operators.

Related Art

European patent document 2548705 A1 'Device for emptying a blood product bag' discloses a device for emptying bags of a frozen blood-derived product made up of a product removal device, a product collection hopper, a cutting device, a device for transporting the bag from a reception area to the product removal device, two holding arms and an actuating device.

In the device disclosed in the above-mentioned document, transport means are responsible for transporting the bag of frozen blood-derived product from a reception area to the product removal device. Said product removal device is made up of two rollers. These rollers rotate in opposite directions and are actuated by a motor so that if a bag is positioned between both rollers, said rollers take up the bag in the opposite direction, leaving the contents of said bag to fall into a product collection hopper. There is a blade in a fixed position midway between the reception area and the removal device. Said blade is located in the path taken by the bag so that while the transport means are moving the bag from the reception area to the removal device, said bag collides with the blade and said blade tears said bag. Because of this tear in the bag, the rollers of the removal device are able to remove said bag and allow the blood product contained therein to fall into the product collection hopper.

Said device has the drawback that because of the variability in the shape of the frozen bags, to ensure that the blade tears the bag, said blade must pass approximately through half the body of the bag, where the volume and mass are greatest. This means that when the bag collides with the blade, said blade is subject to great mechanical stress, which causes said blade to break after few work cycles.

When the blade breaks, the emptying process must be stopped in order to change said blade. This time lapse in which the machine is stopped while the blade is changed is an interruption of the process and consequently represents a significant economic loss.

The disclosure of this section is to provide background of the invention. Applicant notes that this section may contain information available before this application. However, by providing this section, Applicant does not admit that any information contained in this section constitutes prior art.

SUMMARY

An aspect of the present invention is intended to increase the useful life of said cutting blades and thus to extend the operating cycles of the automated processes for emptying bags of frozen blood product.

An aspect of the present invention overcomes the above-mentioned problem by replacing the rigid blade support with an oscillating system capable of cushioning the impact of the blade against the bag. Moreover, an aspect of the present invention also replaces the transport means with other means having the capacity to change their path depending on the shape of the bag, and also modifies the cutting blade.

In embodiments of the present invention, the transport means may use a function which allows their path to be changed in real time depending on a variable. Said variable from which the transport means modify their path is the shape of the bag. More specifically, the parameter used to modify the path of the transport means is the thickness of the bag. Preferably, the transport means comprise a robotic arm. To determine the thickness of the bag that is being transported from the collection area to the product removal device, the oscillating blade system is preferably used as a feeler.

One way of minimising the stresses to which the blade is subjected is to provide the blade with the ability to retract. This can be achieved by the addition of a spring to said blade so that said blade can oscillate. However. the result thus obtained would not be entirely optimal, as there would then be a problem with the spring return, and consequently with the blade, once said blade has finished cutting the bag.

To overcome this drawback, in a particularly preferred embodiment of the present invention, a second spring has been added to the oscillating blade support. Thus, there is a spring responsible for providing the necessary force for cutting and another responsible for compensating the return force of the spring so that the movement of the blade is not too sudden and said blade is not subject to great mechanical stresses.

Moreover, in said preferred embodiment, the cutting blade is connected to a single-turn encoder by means of a resilient coupling, such that the greater the force applied to the blade, the greater the compression of said resilient coupling. Said compression of the resilient coupling is detected by the encoder which then transmits said compression to the robot so that said robot changes its path. Thus, if the bag is very thin the robot scarcely varies its path because the blade oscillates very little. However, if the bag is very thick the robot will change its path significantly, as the blade retracts a great deal. This allows a uniform cut to be made in the bag without the blade being subject to excessive mechanical stresses.

In embodiments the present invention, the depth of cut of the bags depends only on the temperature of the product said bags contain (usually blood plasma) and not on the shape of the bag. Furthermore, the impacts received by the transport means and the blade owing to the different thicknesses of the bag are cushioned by the resilient means system of the blade support.

According to another aspect of the present invention, a novel and more advantageous type of cutting blade is also disclosed. The novel blade, advantageously, is a blade having a continuous edge and two cutting faces. Although the saw-toothed blade disclosed in European patent document 25487054 A1 may also be used with the oscillating support and the cutting means having the ability to vary its path, it has been determined experimentally that better results are obtained using the novel blade having a continuous edge and two cutting faces. Owing to the novel blade, the new functionalities of the transport means and of the oscillating blade support can be used to maximum advantage.

Consequently, an aspect of the present invention discloses an oscillating cutting system which, in conjunction with transport means that are capable of modifying their path depending on the shape of the bags to be cut, said components being incorporated in an automatic device for emptying bags of blood product, increases the useful life of the cutting blade such that the work cycles of said device for emptying bags are increased and the maintenance required by said device is reduced.

BRIEF DESCRIPTION OF THE DRAWING

To aid understanding, explanatory yet non-limiting drawings are included of an embodiment of the automatic device for emptying bags of frozen blood product according to embodiments of the present invention.

DETAILED DESCRIPTION

More specifically, an aspect of the present invention discloses an automatic device for emptying bags of frozen blood product, which comprises: a product removal device, a product reception hopper, transport means for transporting the bag from a reception area to the product removal device and cutting means located in the path of the bag between the reception area and the product removal device; in which the cutting means are housed in an oscillating support which comprises means suitable for absorbing the energy of the impacts of the bag against the cutting means and for returning said cutting means to their initial position.

Once the bag of blood product has been torn by the cutting means, the transport means take the bag to the product removal device. Preferably, said product removal device comprises two rollers. Even more preferably, both rollers are in contact and rotate in opposite directions, so that the bag is made to pass through said rollers applying longitudinal pressure along the entire bag. By means of this arrangement, the frozen blood product can be removed from the bag, and once removed from the corresponding bag, said blood product falls into the product collection hopper.

In an embodiment of the invention, the cutting or tearing of the blood product bag is produced by cutting means. In a preferred embodiment, the cutting means are means for transverse cutting of the bag. In an even more preferred embodiment, said cutting means comprise a blade. More advantageously, said blade is a blade having a continuous edge and two cutting faces arranged at 90°.

In an embodiment of the invention, the cutting means are in a fixed position along the path defined by the transport means responsible for transporting the bags of blood product from the reception area to the product removal device area.

Advantageously, said means for transporting the bag comprise a robotic arm. Even more advantageously, said transport means can modify the path they define using a parameter. Even more preferably, said parameter is the shape of the bag to be cut and emptied. In the most advantageous possible embodiment, the parameter used to modify the path of the transport means is the thickness of the bag.

In a model, the oscillating support acts as a feeler for modifying the path of the transport means.

In a particular embodiment, the cutting means are housed on the shaft of a rocker assembly. In a specific embodiment of the invention, the cutting means housed on the shaft of said rocker assembly may have a maximum oscillation of 15°. Other embodiments in which the oscillation of the cutting means support is linear instead of angular are also possible.

In an embodiment, the above-mentioned rocker assembly comprises a shaft and a rocker. In a more advantageous embodiment said rocker is a half cylinder, although in other embodiments said rocker may take the form of a polygonal prism, a cylinder sector, etc.

In an embodiment of the invention, the shaft of the rocker assembly has different diameters along its length, such that each change of diameter may act as a stop. Preferably, at the front portion thereof, said shaft of the rocker assembly has two different diameters.

In a preferred embodiment of the invention, the circular ring defined by the two different diameters of the shaft of the rocker assembly at the front portion thereof has at least one hole. Preferably, said circular ring comprises two holes arranged along the horizontal shaft symmetrically with respect to the vertical axis.

In a model, the cutting means comprise an elongate groove and at least one hole. Because of said elongate groove, the cutting means are housed in the front portion of the shaft of the rocker assembly of smaller diameter, such that the at least one hole of the cutting means is aligned with the at least one hole of the circular ring defined by the change in diameter of the shaft. Preferably, the cutting means comprise two holes arranged symmetrically with respect to the longitudinal axis of the elongate groove.

In an embodiment of the present invention, the cutting means are attached to the shaft by means of the insertion of a holding pin for each of the at least one hole of the cutting means and of the shaft. Preferably, the cutting means are arranged such that on one side said cutting means abut the circular ring defined by the change in cross section of the shaft and on the other side said cutting means abut a pommel for holding the blade. Preferably, said pommel for holding the blade comprises a longitudinal hole such that the front portion of smaller diameter of the shaft of the rocker assembly is inserted into said longitudinal hole of the pommel for holding the blade. The fit between the shaft of the rocker assembly and the longitudinal hole of the pommel is such that great force is required to remove the pommel, considerably greater than the force to which said connection is subject under normal operating conditions.

In an embodiment of the invention, the means suitable for absorbing the energy of the impact of the bag against the cutting means and for returning the cutting means to their initial position comprise at least one resilient means. Advantageously, the at least one resilient means acts on the rocker. In a preferred embodiment of the invention, the oscillating support comprises a rocker and at least two resilient means arranged so as to create opposite pairs of forces on the rocker. In the most advantageous embodiment, said resilient means are springs. In other embodiments of the invention in which the oscillation of the cutting means support is linear, the resilient means are arranged parallel to the direction of oscillation of the support.

By means of this arrangement of the resilient means, some resilient means are able to produce the necessary force for cutting and the others compensate the return force of the resilient means so that the movement of the blade is not too sudden.

Advantageously, the resilient means that produce the necessary cutting force, or resilient compression means, have an elastic constant (K) that is greater than the resilient means compensating the return force, or simply resilient compensation means. However, other embodiments in which the resilient compensation means have an elastic constant which is greater than or equal to the resilient compression means are also possible.

In a preferred embodiment of the invention, the springs are attached at one end to the rocker and at the other end to a spacer. Preferably, said spacer is attached to the casing of the oscillating blade by non-permanent connection means. Advantageously, said non-permanent connection means are screws.

In an embodiment of the present invention, the various internal parts are housed inside a casing of the oscillating blade. Said casing is closed at one of the ends thereof by a cover which has a sealing gasket on the inner portion. Said cover has a central aperture through which the shaft of the rocker assembly passes. Preferably, a retainer is positioned between the shaft of the rocker assembly and the cover to ensure that the closure is sealed. Preferably, said cover is connected to the casing of the oscillating blade by non-permanent connection means. More advantageously, said non-permanent connection means are screws.

In an embodiment of the invention, a plurality of bearings is located inside the casing of the oscillating blade, the purpose of said bearings being to support the shaft of the rocker assembly and allow said assembly to rotate while minimising the friction.

In a model, the oscillating support comprises a device responsible for transforming the position of the oscillating support into an output signal. Advantageously, said oscillating support comprises a device responsible for transforming the angular position of the cutting means into an output signal.

In an embodiment of the invention, the rear end of the shaft of the rocker assembly is connected to a resilient coupling, which in turn is connected by non-permanent connection means to the device responsible for transforming the position of the rocker assembly into an output signal. Given that the cutting blade is rigidly connected to the rocker assembly, the position of the rocker assembly is equivalent to the position of the cutting blade. Preferably, said resilient coupling is housed inside the casing of the oscillating support, while the device responsible for transforming the position of the rocker assembly into an output signal projects outside the casing of the oscillating blade through an aperture at the rear end thereof. Preferably, there is a retainer between the device responsible for transforming the position of the oscillating support into an output signal and the casing of the oscillating support.

The purpose of the retainers and sealing gaskets which form part of the various embodiments of the present invention is to ensure sealed closure of the various connections in which they are located in order to prevent possible contamination of the blood product. Because the blood product which is removed from the bags will be used subsequently in pharmaceutical applications, it is essential to ensure that said blood product is not contaminated.

In an embodiment, the variable used to determine the position of the rocker assembly is its angular position. In a preferred embodiment of the invention, the device responsible for transforming the angular position of the rocker assembly into an output signal is an encoder. Even more preferably, the output signal of said encoder is an analogue signal. As persons skilled in the art will understand, in other embodiments in which the oscillation of the cutting means support is linear, the sensor used to determine the position of said support and of the cutting means which it houses will be a sensor specifically for this type of movement, that is, a linear position sensor.

In an embodiment of the invention, the voltage of the analogue output signal of the encoder varies depending on the angular position of the cutting means.

In an embodiment of the invention, the encoder is connected to an analogue input card. Said analogue input card is responsible for converting the analogue output signal of the encoder into a digital signal that can be read by the actuating unit of the robotic arm.

In a model, the automatic device for emptying bags of frozen blood product comprises an actuating unit responsible for modifying the path of the transport means according to the signal received from the device responsible for transforming the position of the oscillating support into an output signal.

Preferably, said actuation unit of the robotic arm is a programmable logic controller. Said programmable logic controller is responsible for controlling the movement of the robotic arm.

More preferably, said programmable logic controller is responsible for modifying the path of the robotic arm depending on the angular position of the cutting means.

In an advantageous embodiment, the programmable logic controller attempts to ensure that the cutting means are in a specific angular position, regardless of the thickness and/or shape of the bag to be cut. The target angular position of the cutting means is defined as a target angle. In said advantageous embodiment, the programmable logic controller varies the path defined by the robotic arm so that the angle defined by the cutting means is as close as possible to the target angle.

In this document, the concept of blood product may refer to raw blood, blood plasma or other blood-derived products. In this document, the concept of a blood product and the concept of a frozen blood product are equivalent. The concept of a blade and a cutting blade are used in an equivalent and interchangeable way throughout the present document. Throughout the text, the terms oscillating support and oscillating blade support are used in an equivalent and interchangeable way. In this document, the terms robot and robotic arm are used in an equivalent and interchangeable way.

DETAILED DESCRIPTION

Figure 1:
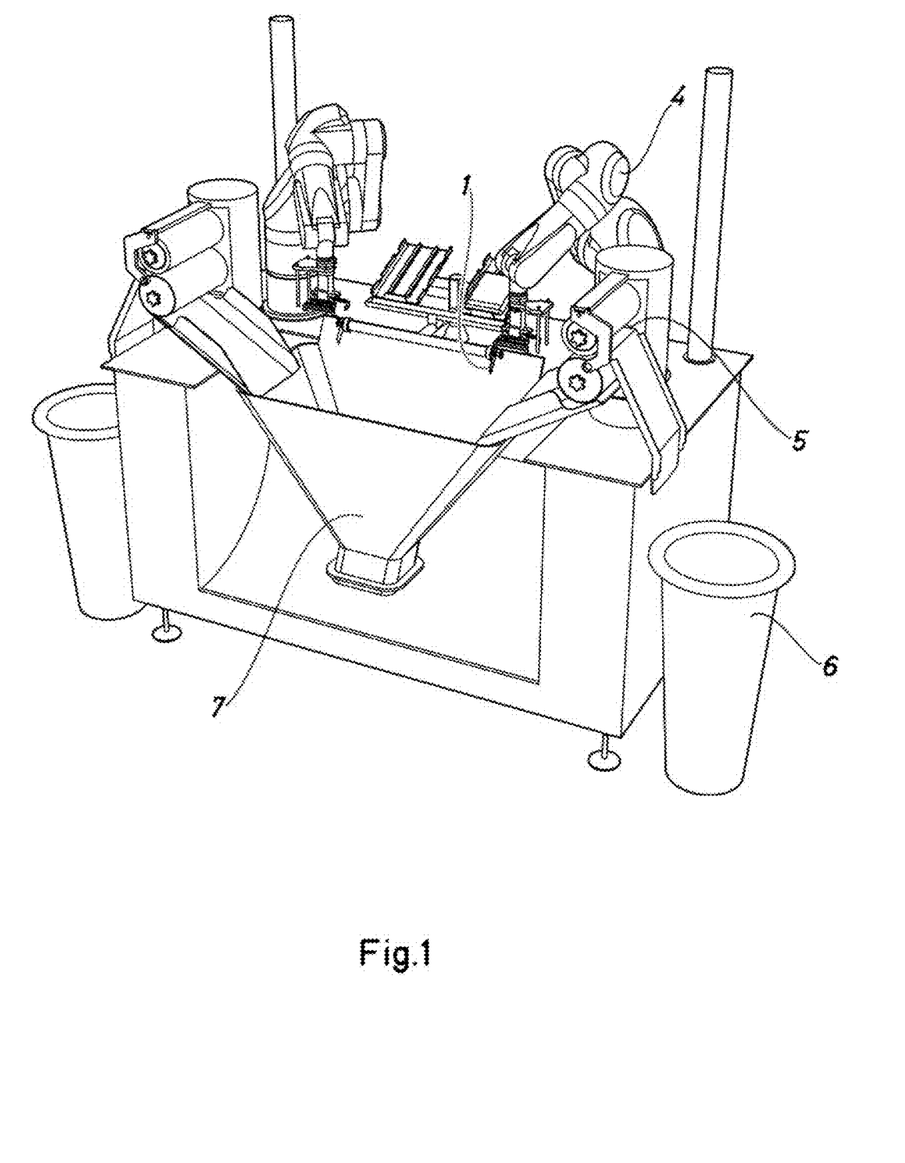
FIG. 1 is a perspective view of the automatic device for emptying bags of frozen blood product.

FIG. 1 shows the automatic device for emptying bags of blood product. In the embodiment shown in FIG. 1, it can be seen that there are two automatic devices for emptying bags of blood product in a single work station. In the embodiment shown, both devices share the blood product collection hopper -7- and the remaining elements are duplicated. In this embodiment, it can be seen that the transport means are a robotic arm -4-. Said robotic arm -4- is responsible for transporting the bags of blood product (not shown) from the reception area to the removal device -5-. The plastic bag is taken up by the removal device -5- in the direction opposite to that of the frozen blood product and said bag falls into a used-bag collection container -6-.

In the embodiment shown in FIG. 1, the removal device -5- comprises two parallel rollers which rotate in opposite directions, so that if a bag is positioned between both rollers, said rollers take up the bag in the direction opposite to that of the frozen blood product, leaving the blood product to fall into the collection hopper -7-.

In the embodiment of FIG. 1, midway between the reception area and the removal device -5-, in a fixed position, there is a blade housed in the oscillating support -1-. Said oscillating support -1- and the corresponding blade are located in the path taken by the bag so that while the robotic arm -4- transports the bag from the reception area to the removal device -5-, said bag collides with the blade and said blade tears said bag. Because of this tear in the bag, the rollers of the removal device -5- are able to remove said bag.

The robotic arm -4- shown in FIG. 1 has the capacity to modify its path depending on the shape of the bag of blood product to be emptied. To do this, the oscillating support -1-, as well as holding the cutting blade, also acts as a feeler to determine the shape of the bag and so that the robotic arm -4- can change its path accordingly. The purpose of changing the path of said robotic arm -4- is to maintain the cutting blade at a given target angle.

Figure 2:
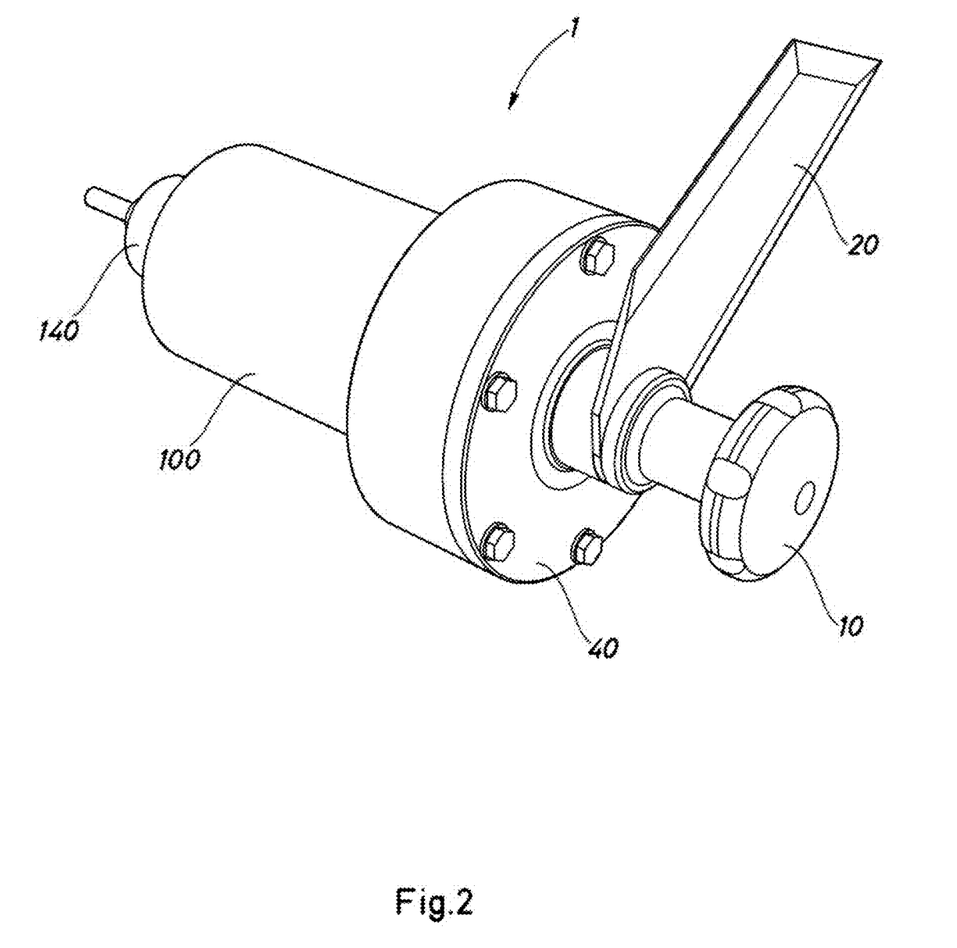
FIG. 2 is a perspective view of the oscillating blade support.

FIG. 2 shows the oscillating support -1- according to the invention in its entirety. The internal components of said oscillating support -1- are inside a casing -100- which is closed at the front portion thereof by a cover -40-. Because the cover -40- is connected to the casing -100- by non-permanent connection means, in this case screws, the inside of the oscillating support -1- can be easily accessed in order to replace or maintain the internal components thereof.

As can be seen in FIG. 2, the oscillating support -1- for securing the blade -20- has, among other components, a securing pommel -10-. The encoder -140- projects from the rear portion of the casing -100-. Said encoder -140- is responsible for transforming the angular position of the blade -20- into an output signal. Said output signal will then be used to determine the path the transport means (not shown) should follow.

Figure 3:
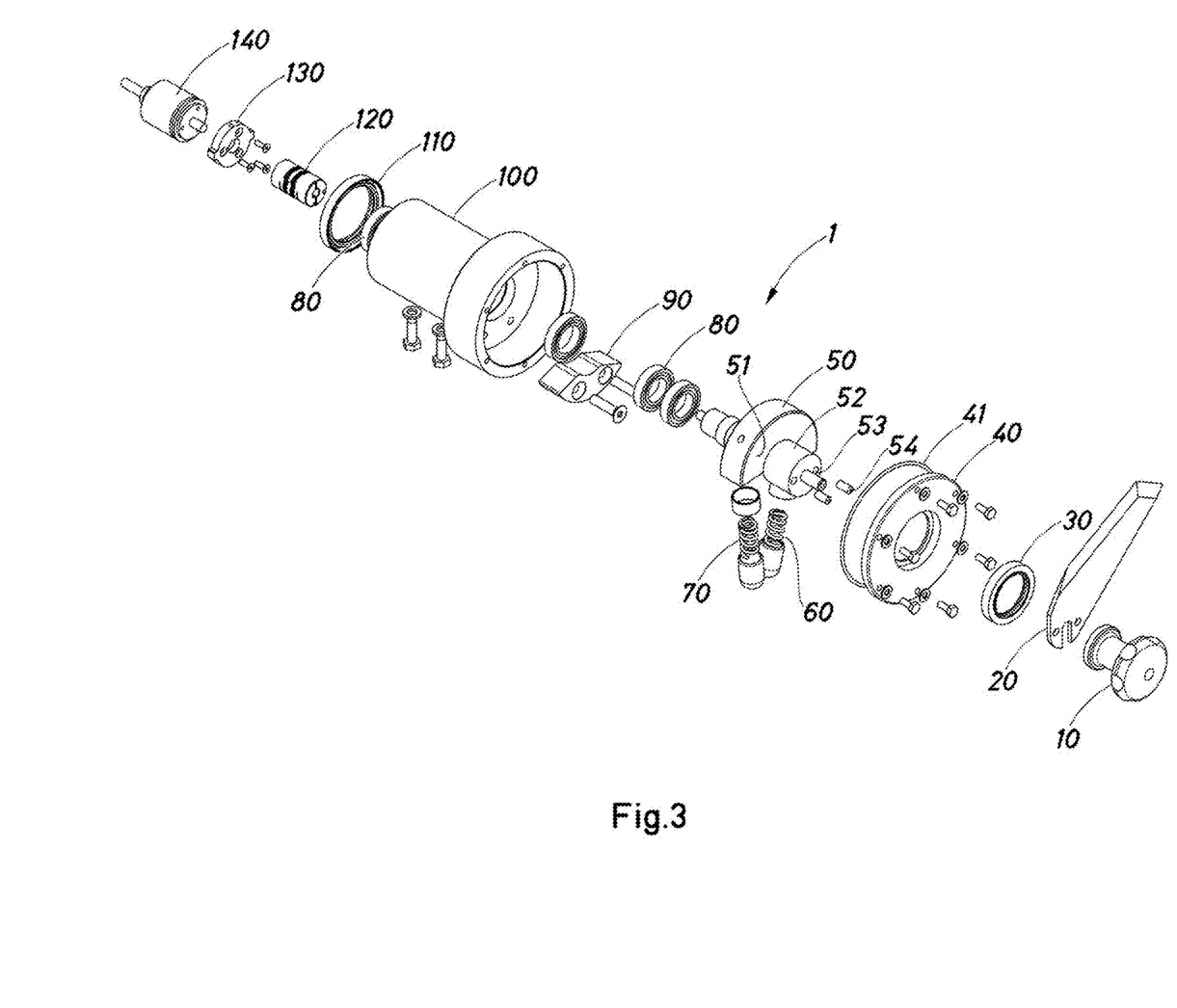
FIG. 3 is an exploded perspective view of the oscillating blade support.

FIG. 3 shows an exploded perspective view of all the components of this embodiment of the oscillating support -1-. As can be seen, at the front end of the oscillating support -1- there is a securing pommel -10-, of which the function is to ensure that the blade -20- remains in position. The blade -20- is housed in the shaft -52- of the rocker assembly -50-. As can be seen in FIG. 3, the shaft -52- of the rocker assembly -50- has different diameters along its length, such that each change of diameter can act as a stop. In the embodiment shown in FIG. 3, the blade -20- abuts with the reduction in diameter of the shaft -52- of the rocker assembly -50- at the front portion thereof. Moreover, to secure the blade -20-, said blade -20- and the circular ring defined by the change in diameter of the shaft -52- have two apertures -53- through each of which securing pins -54- are inserted.

As can be seen in FIG. 3, the rocker assembly -50- comprises a rocker -51- which, in this embodiment, is semi-cylindrical. In the embodiment shown, two springs act on the rocker -51-, said springs being arranged symmetrically with respect to the vertical axis and so as to create opposite pairs of forces on the rocker. In the embodiment shown, the compression spring -60- has an elastic constant (K) which is greater than that of the compensation spring -70-. The compression spring -60- is responsible for producing the force required for cutting, while the compensation spring -70- is responsible for compensating the return force of the compression spring -60- so that the movement of the rocker -51- is not too sudden. In this embodiment, the two springs -60-, -70- each pass through bushes -61-, -71-.

In the embodiment shown in FIG. 3, the compression -60- and compensation -70- springs are attached at their upper end to the rocker -51- and at their lower end to a spacer -90-. In this embodiment, the spacer -90- has the shape of a cylinder sector and is connected to the casing -100- by non-permanent connection means.

To support the rocker assembly -50- and the components housed therein and to facilitate the rotation thereof while minimising friction, the oscillating support -1- has at least one bearing -80-. In the embodiment shown in FIG. 3, the oscillating support -1- has four bearings -80- arranged along the shaft -52- of the rocker assembly -50-.

As can be seen in the embodiment shown in FIG. 3, the shaft -52- of the rocker assembly -50- is connected by the rear portion thereof to a resilient coupling -120-, which in turn is connected to the encoder -140-. The functions of the resilient coupling -120-, among others, are to correct misalignments and to cushion shocks and vibrations, and to provide smooth and silent transmission of movement. Said encoder -140- is supported by an encoder support -130-. Said encoder support -130- has a central aperture through which a shaft of the encoder -140- passes. Said shaft of the encoder -140- which passes through the support -130- is connected to the resilient coupling -120-. In the embodiment shown, the encoder -140- is connected to the support thereof -130- by non-permanent connection means, which in this case are screws. The support -130- in turn fits inside the casing -100-.

In the embodiment shown in FIG. 3, the internal components of the oscillating support -1- are housed inside the casing -100-. At the front portion thereof, the casing -100- is closed by a cover -40-. As explained above, the cover and the casing are connected preferably by non-permanent connection means. To provide a sealed closure, the cover -40- has a sealing gasket -41- on its inner side. The cover has a central aperture through which the shaft -52- of the rocker assembly -50- projects. As can be seen in FIG. 3, in the embodiment shown, there is a retainer -30- between the cover -40- and the shaft -52- of which the purpose is to provide a seal and prevent the blood product from being able to enter the interior of the oscillating support -1-, thus preventing contamination of the blood product and the deterioration of the components of said oscillating support -1-.

In this embodiment, the encoder -140- projects through an aperture of the rear portion of the casing -100-. A retainer -110- is positioned between said aperture of the rear portion of the casing -100- and the encoder -140- to provide a seal.

Figure 4:
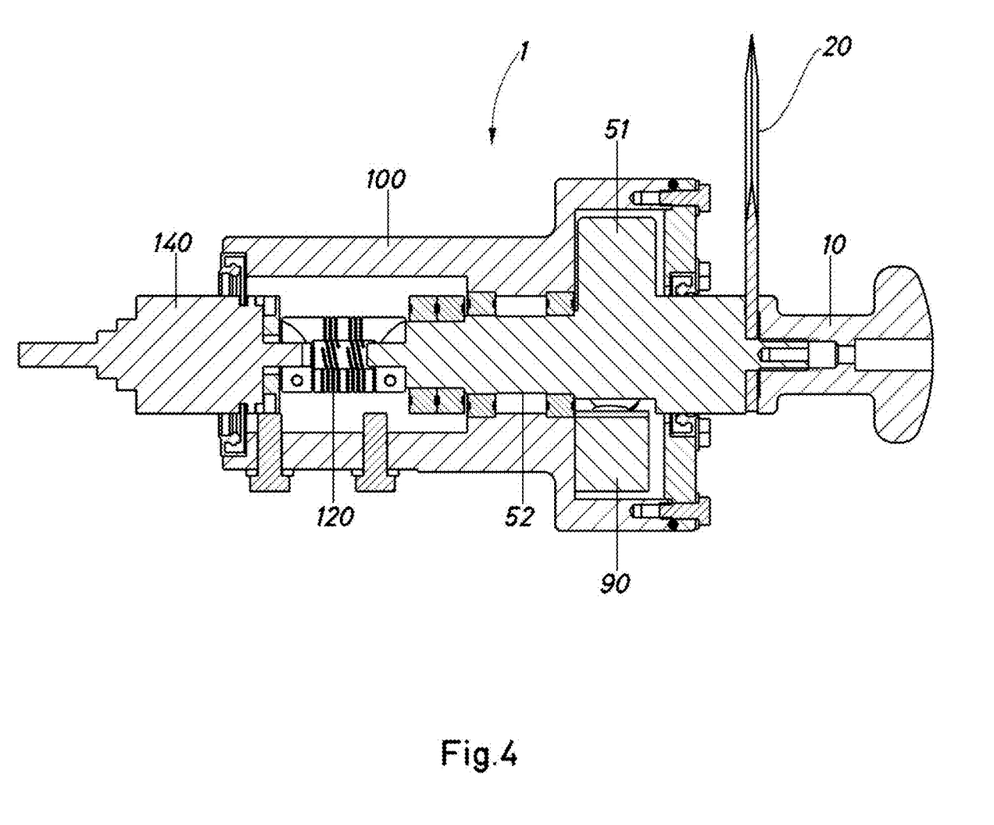
FIG. 4 is a view in longitudinal cross section of the oscillating blade support.

FIG. 4 is a view in lateral cross section of the oscillating support -1-. This figure shows in great detail how the various components are assembled and their arrangement in the oscillating support -1-.

Figure 5:
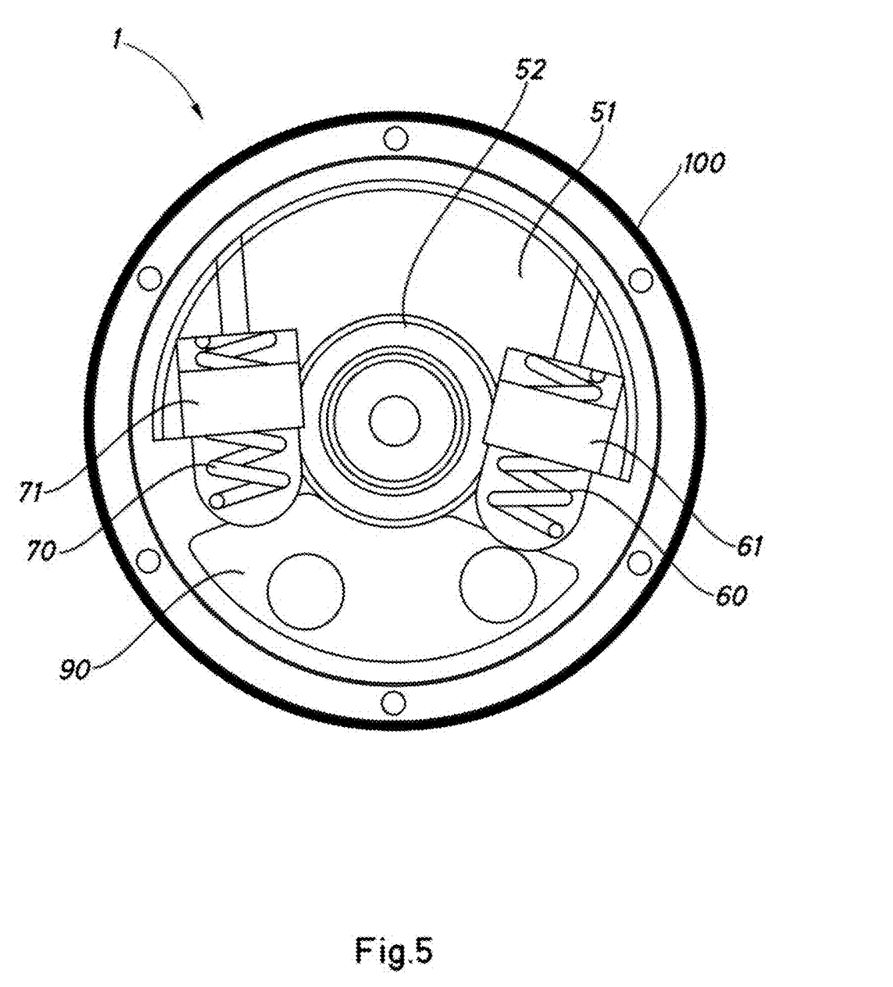
FIG. 5 is a view in transverse cross section of the oscillating blade support.

FIG. 5 is a view in transverse cross section of the oscillating blade support -1-. Said figure shows in greater detail the arrangement of the rocker assembly -50- and the remaining auxiliary components which give the support its oscillating character. This figure shows how, in this embodiment, both the compression spring -60- and the compensation spring -70- are attached at their upper end to the rocker -51- and at their lower end to the spacer -90-. It also shows how each spring -60-, -70- has a corresponding bush -61-, -71-. The springs -60-, -70- pass through the corresponding bush -61-, -71- in such a way that said bushes act as guides. As can be seen in this figure, in the embodiment shown, both the springs -60-, -70- and the bushes -61-, -71- are arranged symmetrically with respect to the vertical axis.

Figure 6:
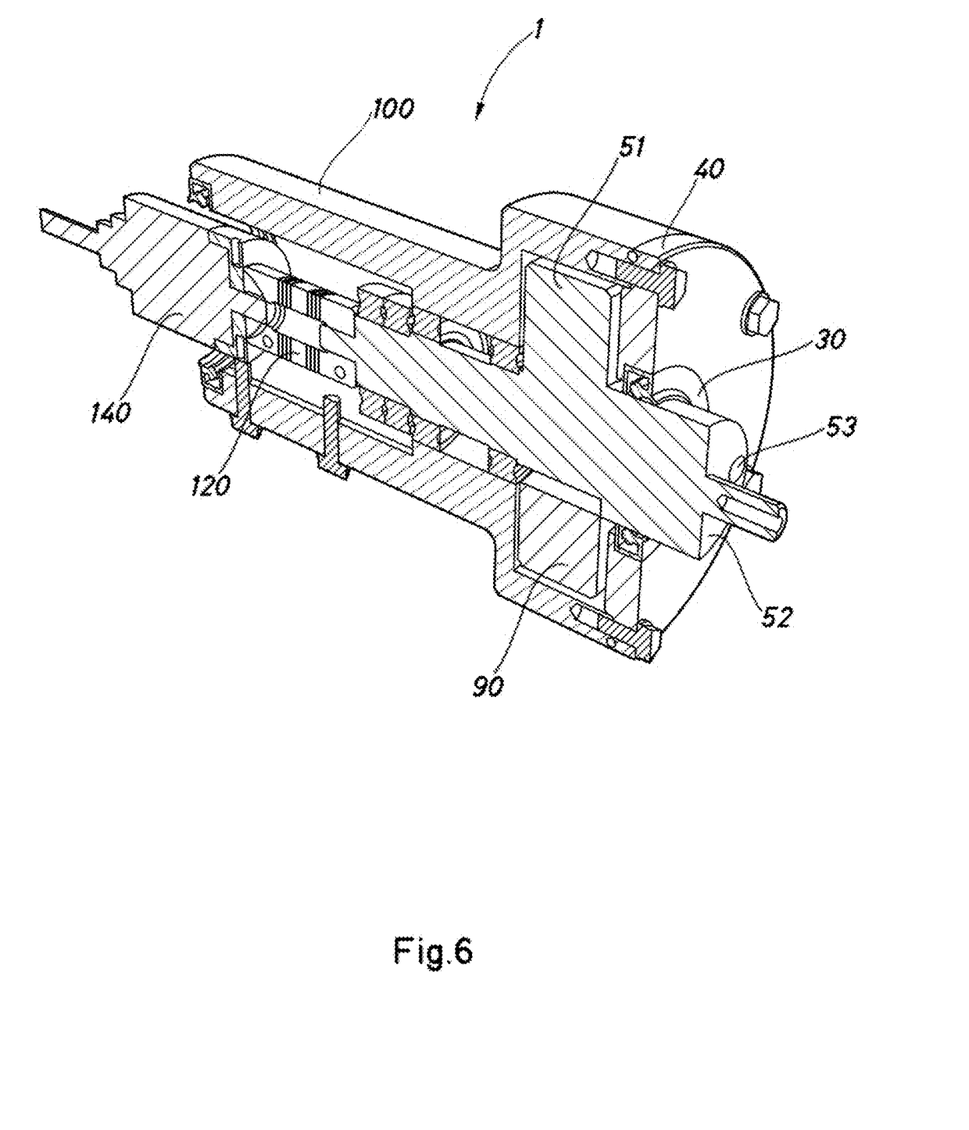
FIG. 6 is a perspective view in longitudinal cross section of the oscillating blade support.

FIG. 6 is a perspective view in longitudinal cross section of the oscillating blade support. This figure shows with great clarity how the various components comprised in the oscillating support -1- are positioned.

Figure 7:
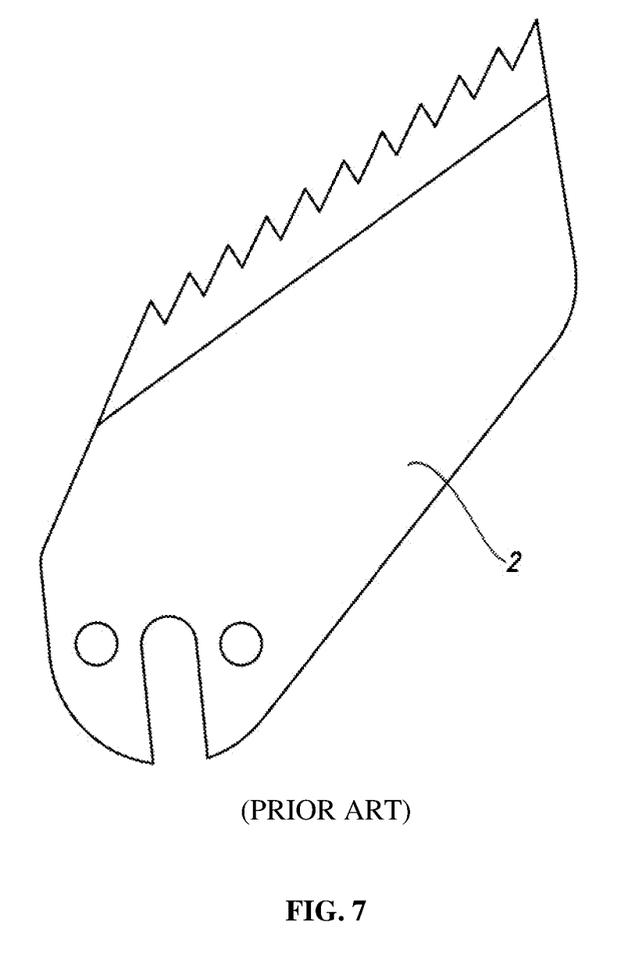
FIG. 7 is a view in front elevation of a blade belonging to the prior art.

FIG. 7 shows the blade used in the device disclosed by European patent document 2548705 A1. During the development phase of the present invention, it was observed that the blade -2- used previously, although acceptable, was not the optimal solution for use in the oscillating support -1- and in combination with the transport means having the capacity to modify their path. For this reason, the design of the cutting blade has been optimised for use with the oscillating support -1- and the novel transport means.

Figure 8:
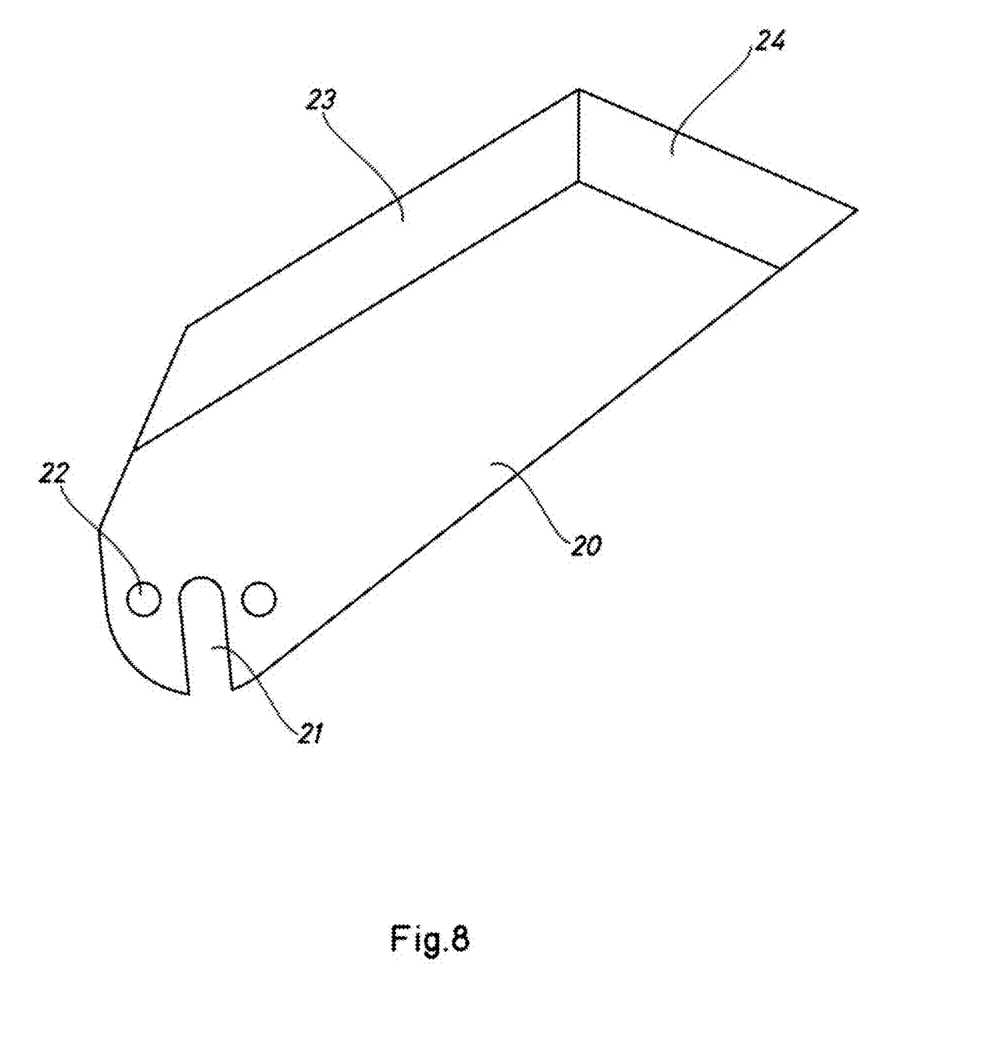
FIG. 8 is a view in front elevation of a blade according to the present invention.

FIG. 8 shows the optimised blade for use in conjunction with the oscillating support -1- and the transport means having the capacity to modify their path. In the most optimal embodiment, the blade -20- has two continuous-edge cutting faces -23-, -24- oriented perpendicularly to one another. As can be seen, in this embodiment the blade comprises an elongate groove -21- and two apertures -22- arranged symmetrically with respect to the longitudinal axis of the elongate groove -21-. To secure the blade -20-, the shaft -52- is housed in the elongate groove -21- in such a way that the apertures -22- are aligned with the corresponding apertures -53- in the circular ring defined by the change in diameter of the shaft -52-. To ensure that the blade will not move, securing pins -54- are inserted through the apertures -22- in the blade -20- and the apertures -53- in the shaft -52-. In addition, to secure the blade a securing pommel -10- is provided, which is attached to the shaft -52- (see FIGS. 2 to 4).

Figure 9:
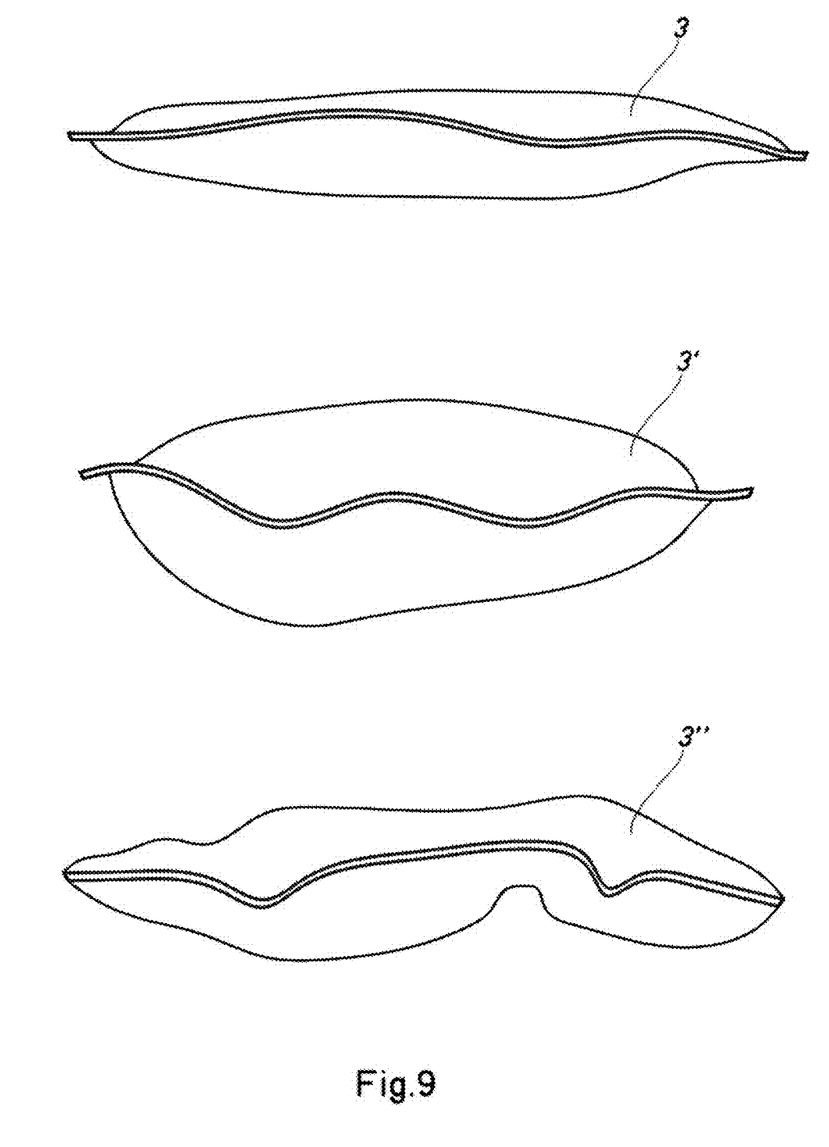
FIG. 9 shows various shapes that the bags of frozen blood product could adopt.

FIG. 9 shows, purely for illustrative purposes, three bags -3-, -3'-, -3"- of blood product which show by way of example various shapes that the bags of blood product might adopt once frozen. As can be seen, the bags -3-, -3'-, -3"- show a great disparity of shapes, which makes difficult automation of the process of emptying said bags of frozen blood product.

Figure 10:
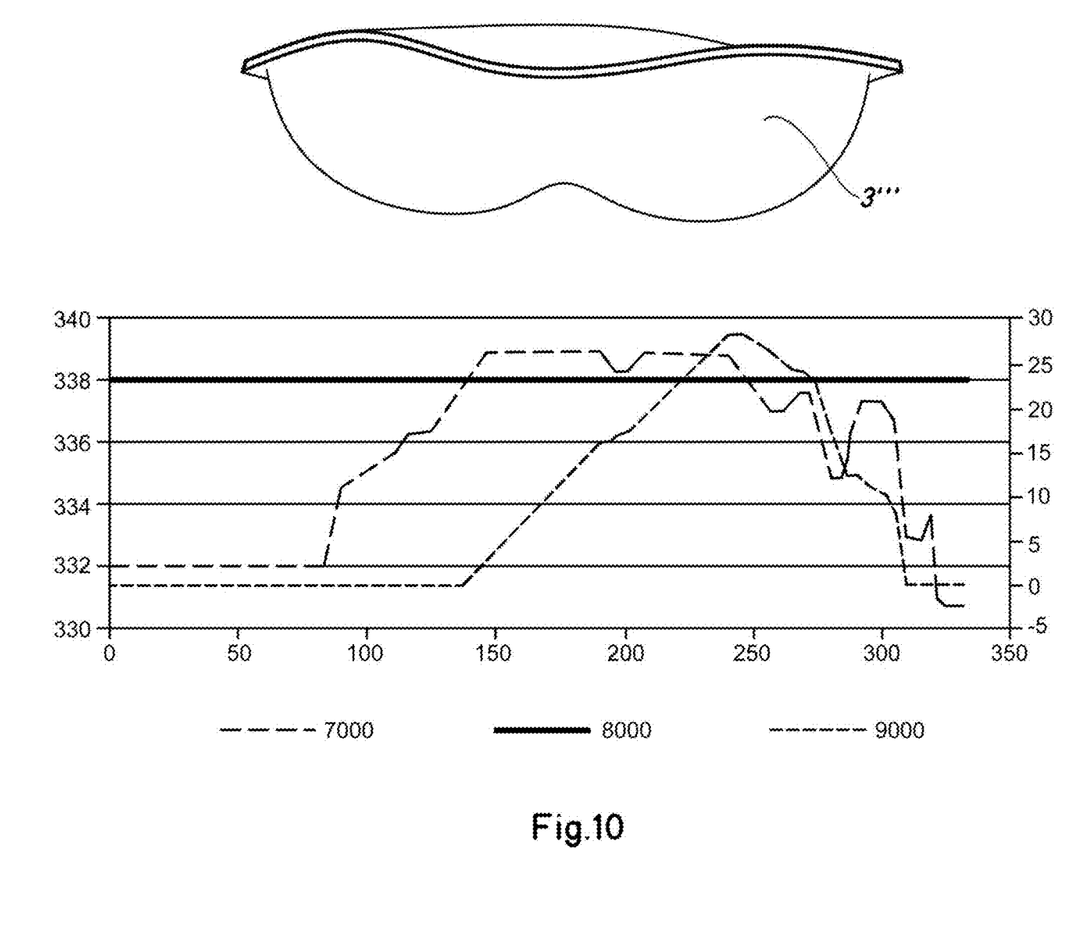
FIG. 10 shows an example of the readings of the encoder and of the height of the robotic arm for a given target angle of the blade and a specific bag shape.

FIG. 10 shows, purely for illustrative purposes, an example of the readings for the blade angle -7000- and the variation in height of the transport means during cutting -9000- for a given target angle -8000- and a bag -3'"- of blood product of a specific shape.

As can be seen in the graph, as the bag increases in thickness, this is reflected by the blade angle -7000- read by the encoder -140-. In this embodiment, the transport means are programmed so that the path is unchanged until the blade angle -7000- exceeds the value of the target angle -8000-, from which point the height of the transport means begins to increase, until the blade angle -7000- falls, at which point the transport means stop rising or descend depending on the variation in the blade angle -7000-. Finally, when the blade angle -7000- has returned to the initial position, the device detects that the bag has already passed through the blade and the transport means descend to the initial height.

In the device according to an embodiment of the present invention, parameters such as the target blade angle -8000-, the variation in height -9000- of the transport means depending on the blade angle -8000-, sensitivity to changes in angle, etc., can be configured depending on the type of results desired (maximising the useful life of the blade, minimising cutting time, etc.).

Figure 11:
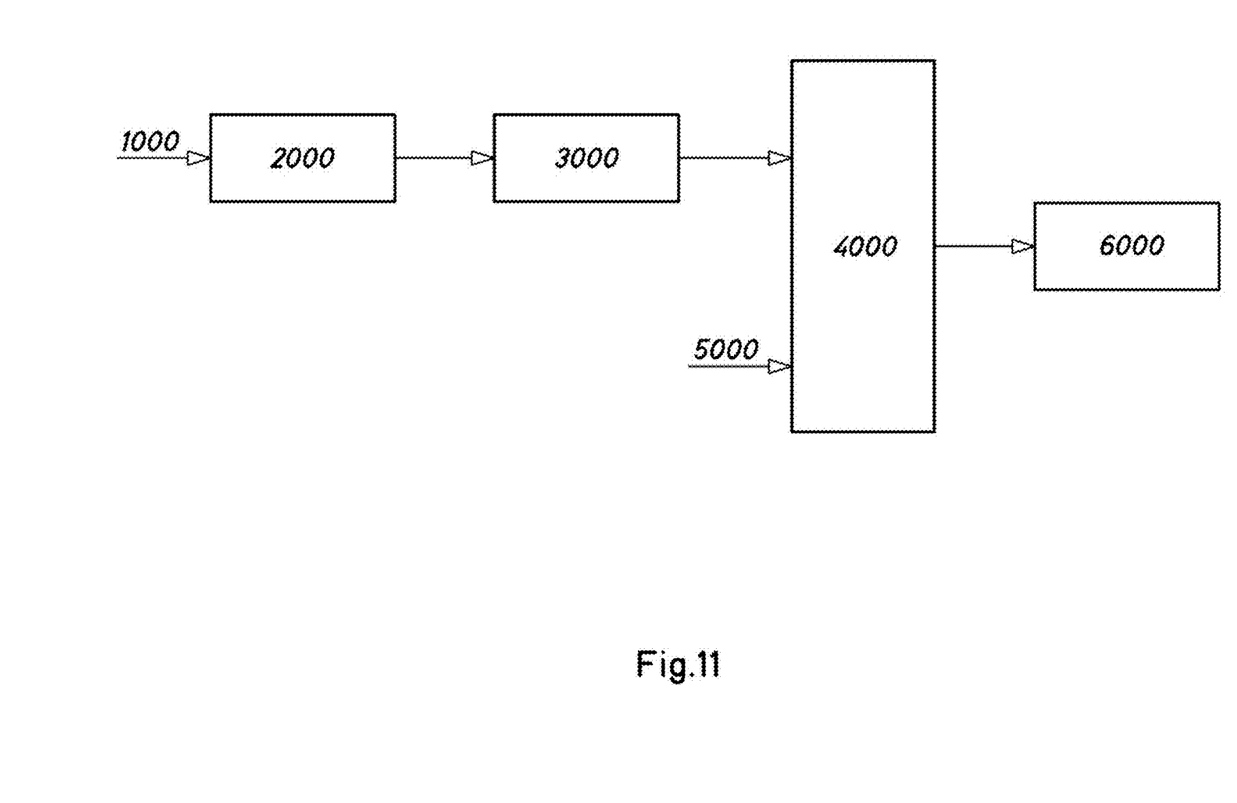
FIG. 11 is an operating diagram of the actuation of the robotic arm.

Finally, FIG. 11 is an operating diagram of the actuation of the robotic arm -4- which in this embodiment acts as a transport means. As can be seen in the figure, the process begins with the encoder -2000- reading the angular position of the blade -1000-. In this embodiment, the encoder generates an analogue output signal which is read by an analogue input card -3000- which is responsible for digitising the output signal of the encoder -2000-. The output signal of the analogue input card -3000- is read by a programmable logic controller (PLC) -4000-. A target blade angle -5000- is also introduced into the programmable logic controller -4000-. Depending on the actual angle and target angle of the blade, the programmable logic controller -4000- determines if it is necessary to raise or lower the robotic arm -6000-, which transports the bags of frozen blood product from the reception area to the removal area.

Although the invention has been described and illustrated using certain embodiments, it should be understood that said embodiments were given by way of example in no way limits the present invention, and therefore any variations which are included directly or as equivalents in the content of the accompanying claims should be considered as included within the scope of the present invention.

What is claimed is:

1. A device for emptying a bag of a frozen blood product, the device comprising:
   a product removal device;
   a product reception hopper;
   a transporter configured to transport the bag along a path from a reception area to the product removal device;
   a cutter located in the path and configured, at a cutting position, to cut the bag over the product reception hopper such that the frozen blood product falls into the product reception hopper from the bag; and
   a support configured to support the cutter,
   wherein the support comprises a rocker assembly that is configured to oscillate for absorbing energy of an impact of the bag against the cutter at the cutting position and is further configured to return the cutter to the cutting position after the impact,
   wherein the rocker assembly comprises:

a rocker coupled to the cutter such that the cutter angularly oscillates together with the rocker in response to impacts against the cutter, a compression spring configured to exert force to the rocker in a first direction for supporting the cutter to cut the bag, and a compensation spring configured to exert force to the rocker in a second direction against the first direction for returning the cutter to the cutting position.

2. The device according to claim 1 wherein the transporter is configured to modify the path for transporting the bag depending on a shape of the bag.

3. The device according to claim 1, wherein the support is configured to operate as a feeler for modifying the path of the transporter.

4. The device according to claim 1, wherein the transporter comprises a robotic arm.

5. The device according to claim 1, wherein the support comprises a device configured to transform an angular position of the cutter into an output signal.

6. The device according to claim 5, wherein the support comprises an encoder configured to transform the angular position of the cutter into the output signal.

7. The device according to claim 6, further comprising an actuator configured to modify the path for transporting the bag according to the output signal.

8. The device according to claim 6, further comprising a resilient coupling configured to connect the encoder and the rocker.

9. The device according to claim 1, wherein the cutter comprises a blade.

10. The device according to claim 9, wherein the blade comprises continuous edges and two cutting faces oriented perpendicularly to one another.

11. The device according to claim 1, wherein the compression spring has an elastic constant greater than that of the compensation spring.

12. A method for emptying a bag of frozen blood product using the device of claim 1, the method comprising:

transporting, using the transporter, the bag along a path from the reception area to the product removal device;

cutting, using the cutter, the bag at a cutting position over the product reception hopper such that the frozen blood product falls into the product reception hopper from the bag; and causing the rocker assembly to oscillate for absorbing energy of an impact of the bag against the cutter at the cutting position and to return the cutter to the cutting position after the impact, wherein the rocker assembly comprises:

a rocker coupled to the cutter such that the cutter angularly oscillates together with the rocker in response to impacts against the cutter, a compression spring configured to exert force to the rocker in a first direction for supporting the cutter to cut the bag, and a compensation spring configured to exert force to the rocker in a second direction against the first direction for returning the cutter to the cutting position.

* * * * *